Patented Dec. 23, 1924.

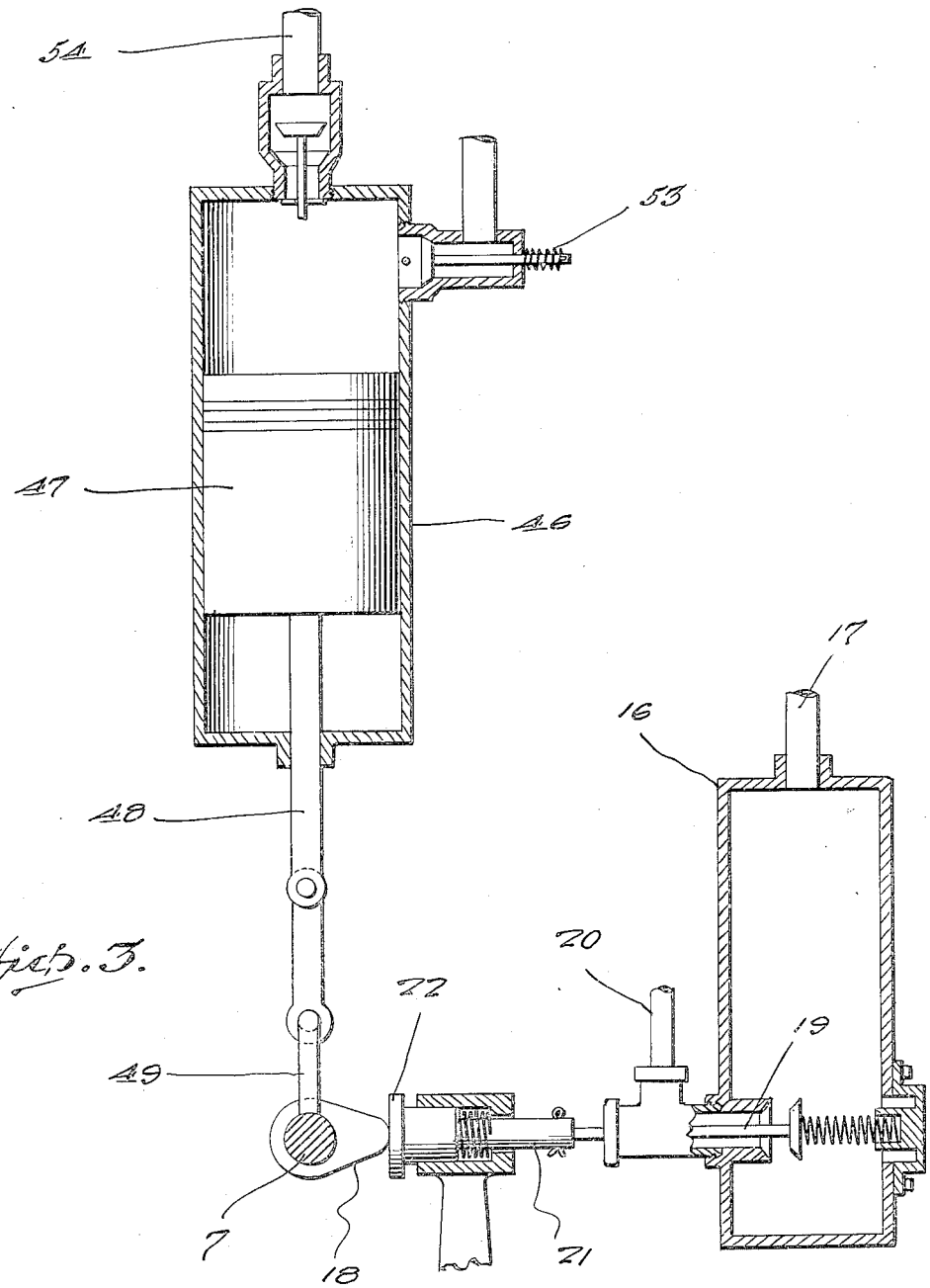

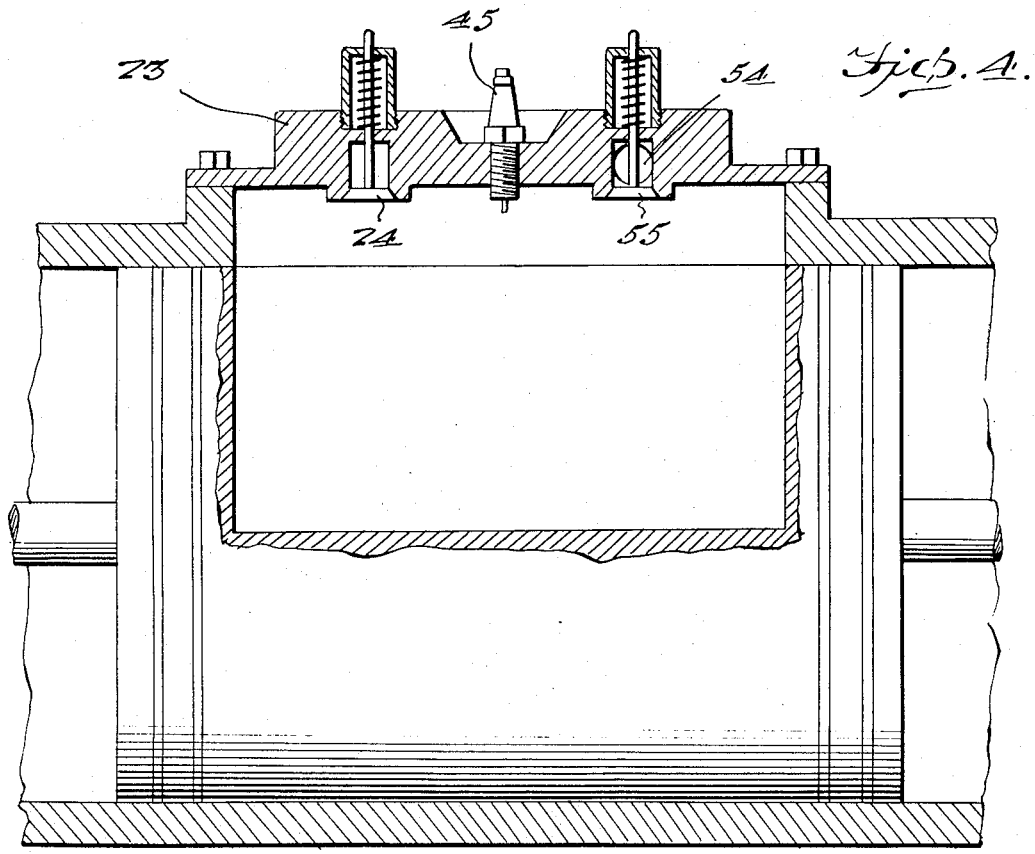
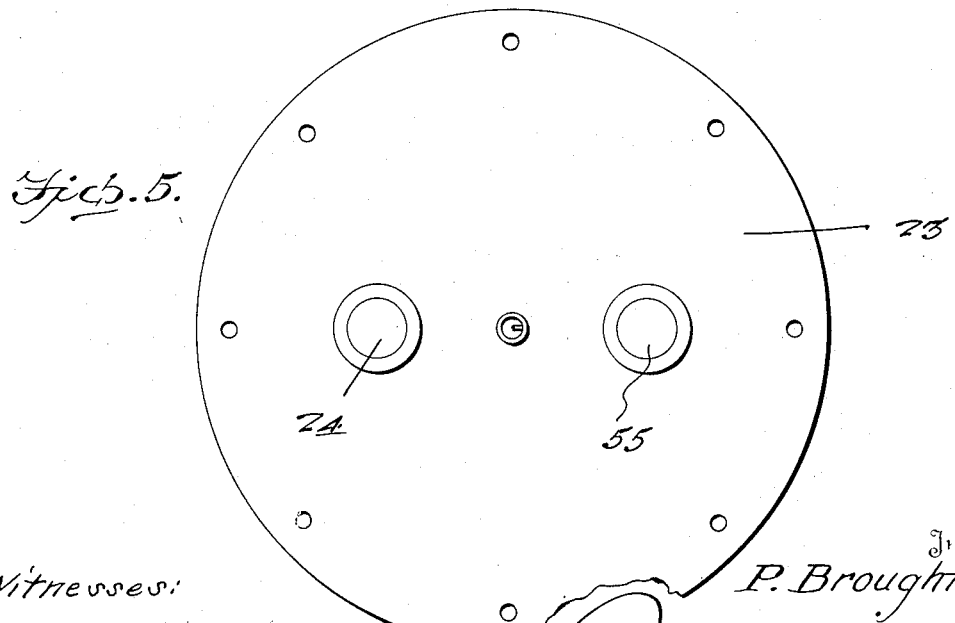

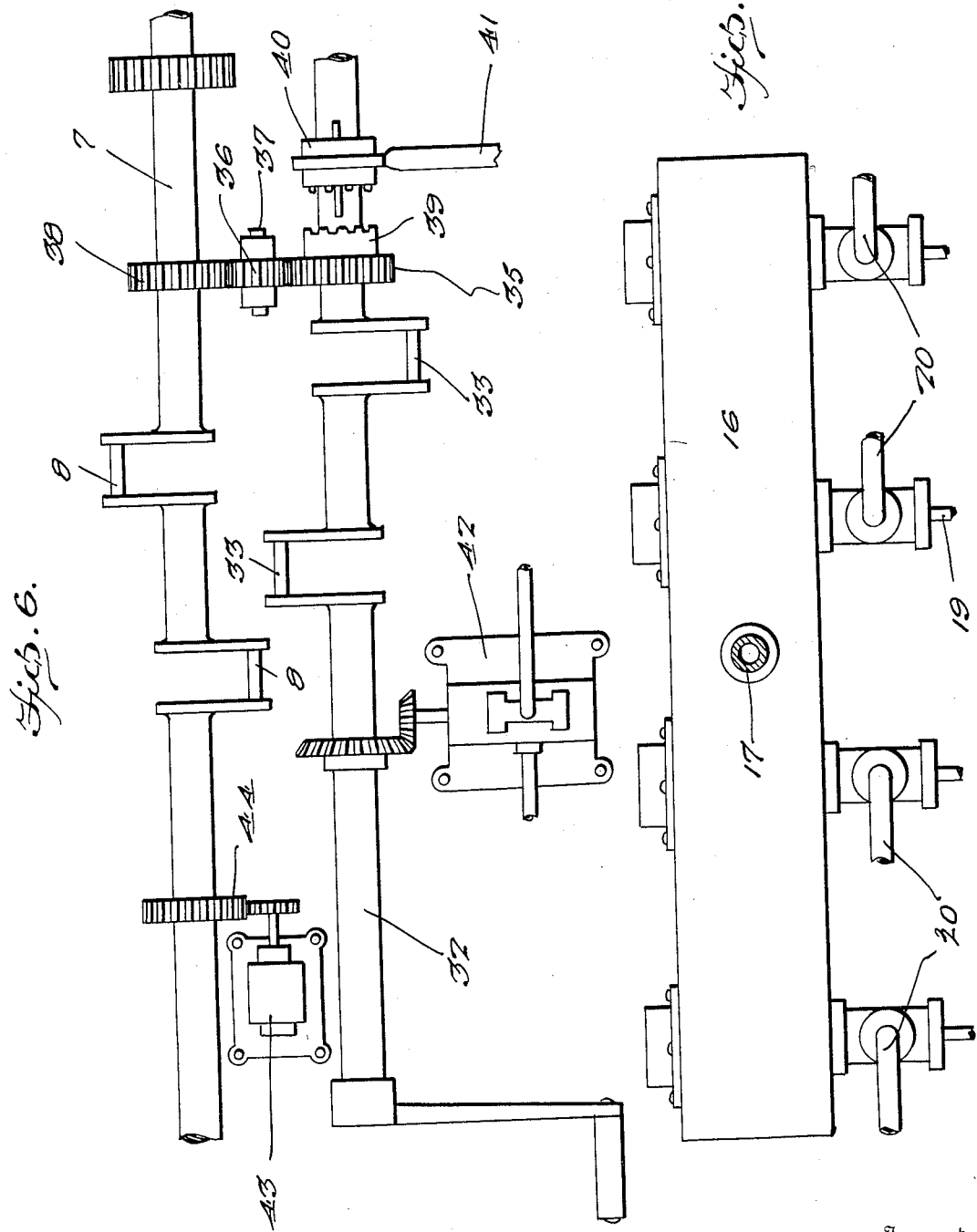

1,520,005

UNITED STATES PATENT OFFICE.

PATRICK BROUGHTON, OF NEW LONDON, CONNECTICUT.

POWER PLANT.

Application filed June 7, 1923. Serial No. 643,820.

*To all whom it may concern:*

Be it known that I, PATRICK BROUGHTON, a citizen of the United States, residing at New London, in the county of New London and State of Connecticut, have invented certain new and useful Improvements in Power Plants, of which the following is a specification.

This invention relates to certain new and useful improvements in power plants of that type embodying an explosive engine, which employs volatile liquid and compressed air as a motive agent.

The primary object of the invention is to provide a power plant of the above kind, by means of which greater efficiency is had at a minimum expense, and wherein a continued operation of the engine may be had for a limited length of time, should the ignition or gasoline feeding mechanism fail in their operation, so that a safe landing can be had when the invention is employed for use as a power plant for air-planes or the like.

A further object is to provide a power plant, which is characterized by an engine of the rotary internal combustion engine type, and wherein novel and improved means is provided for feeding at proper intervals of time, an explosive charge to the several cylinders of the prime mover, and at the same time supplying charges of compressed air to said cylinders, whereby a high power motor is provided, which consumes a relatively smaller amount of gasoline or the like.

With the above general objects in view and others that will become apparent as the nature of the invention is better understood, the same consists in the novel form, combination, and arrangement of parts hereinafter more fully described, shown in the accompanying drawings and claimed.

In the drawings wherein like reference characters indicate corresponding parts throughout the several views:

Figure 3 is an enlarged fragmentary detail view, partly in vertical section and partly in elevation, showing the compressed air distributing air valve chest, and one of the charged compressed fragmentary cylinders, together with associated parts.

Figure 4 is a longitudinal sectional view of the device shown in Figure 2.

Figure 5 is a bottom plan view of the head of the cylinder shown in Figure 2.

Figure 6 is an enlarged fragmentary plan view, showing the crank shafts of the secondary motor and the air compressor, together with associated parts, and Figure 7 is a top plan view of the compressed air discharging valve chest shown in Figure 3.

Figure 1:
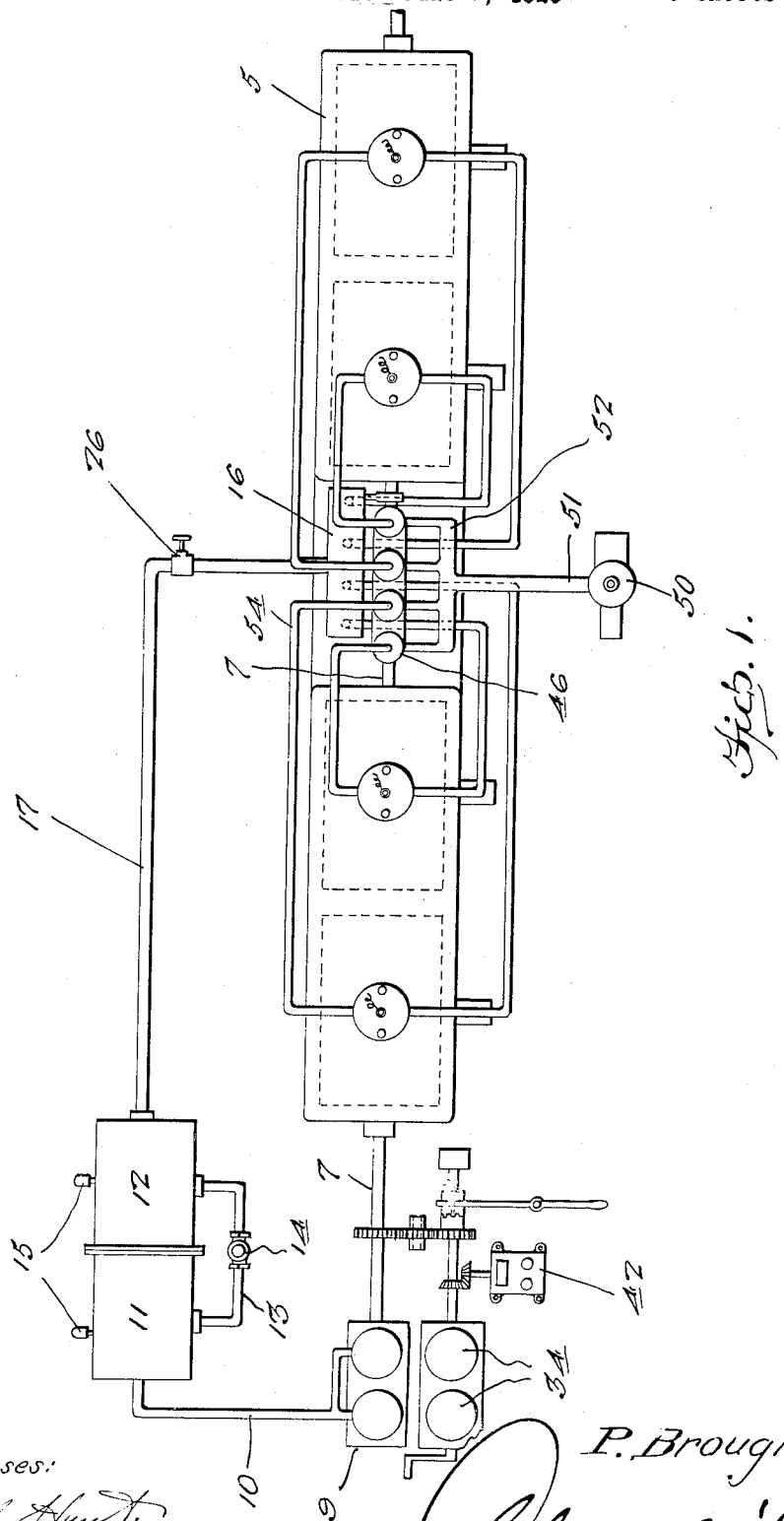
Figure 1 is diagrammatic plan view of a power plant constructed in accordance with the purpose of the present invention.

Referring more in detail to the several views, and particularly to Figure 1, the invention embodies a prime mover 5 in the nature of a multiple cylinder rotary internal combustion engine, the form of the prime mover, as shown, consisting in the provision of four cylinders arranged in spaced pairs. The cylinders of the prime mover are arranged in end to end relation and the rotors 6 thereof are fixed (Figure 6) upon a common drive shaft 7, which projects forwardly, and is provided with a pair of cranks 8 upon the forward end portion thereof, serving to operate the pistons of an ordinary air compressor 9 of the solid piston rectilinear type. The air compressor 9 has a discharge line 10, leading to the high pressure compartment 11 of an air tank, and this high pressure compartment is connected with a low pressure compartment 12 of the tank by means of a by-pass 13 having a reducing valve 14 located therein. Each of the compartments 11 and 12 are provided with safety valves as at 15 adjusted to "blow-off" at a predetermined proper pressure.

Figure 2:
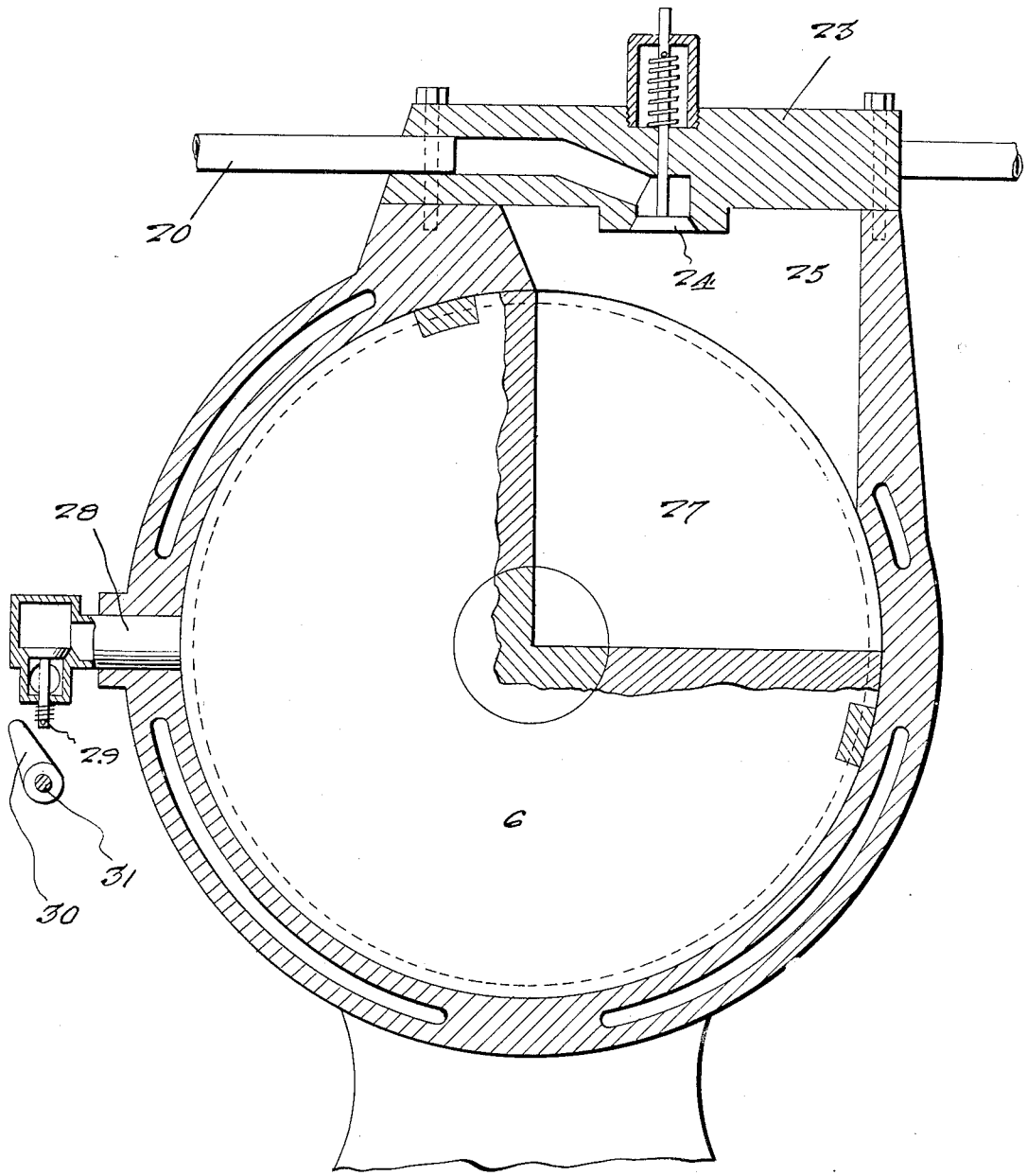
Figure 2 is an enlarged cross sectional view, taken substantially centrally through one of the cylinders of the prime mover, and partly broken away.

In the space between the pairs of cylinders of the prime mover 5, the air distributing valve chest 16 is mounted, which chest has an intake port communicating with the discharge line 17 of the low pressure chamber 12. As shown in Figure 3, the air shift 16 is disposed beside the central exposed portion of the drive shaft 7, and this portion of the shaft 7 is provided with a plurality of spaced cams, one of which is shown at 18 in Figure 3. In transverse alinement with each cam 18, the valve chest 16 is provided with a spring seated valve 19, which controls the discharge of air from the valve chest to its respective discharge line 20. A discharge line 20 is provided, leading from the valve chest 16 to each of the cylinders of the prime mover 5, as clearly shown in Figure 1, and as the admission of air to each discharge line is accompanied by the same mechanism, the description of one will suffice. This construction is clearly shown in Figure 3, wherein the valve 19 has an outwardly projecting stem abutting the end of a spring pressed plunger or tappet rod 21, which has an enlarged outer end or head 22 yieldably held into engagement with the adjacent cam 18. It will be understood that the cams 18 are staggered or set at different positions about the shaft 7 so as to complete the operation of the valves 19 in proper sequence as is well known in the art, with respect to multiple cylinder engines, wherein the several pistons are given an impulse stroke at different times, and in rapid succession. As will be seen from Figures 2, 4 and 5, each cylinder of the prime mover 5 is provided with a removable head 23 containing an outwardly seating spring pressed valve 24, which allows the free passage of the compressed air into the firing chamber 25 of the cylinder from the discharge line 20 of the air chest. Any suitable form of control valve 26 may be placed in the discharge line 17 for regulating the volume of compressed air supplied to the chest 16, and consequently controlling, to a great extent, the speed of the prime mover. The piston 6 of each cylinder may be of any construction, but is preferably of the type, embodying a solid cylindrical member with one-fourth of the same cut away at 27, and in communication with the firing chamber 25 when in the position shown in Figure 2, at one side of the longitudinal center of the cylinder.

At the opposite side of the cylinder there is provided an exhaust port 28 having a suitable spring seated valve 29, which is opened at the proper time, through the medium of a cam 30, which may be fixed upon a suitable counter-shaft 31, operatively geared in any well known manner to the shafts 7.

Disposed upon the forward projecting end of the shaft 7, and parallel with the latter, there is provided a crank shaft 32, (see Figure 6) having cranks 33 for operative connection with the piston rods of an ordinary two cylinder internal combustion engine 34. The shaft 32 has a spur gear 35 rotatably mounted upon the rearwardly projecting end thereof and this gear 35 meshes with an idling pinion 36, rotatably carried upon a suitably supported counter-shaft 37, the pinion 36 meshing in turn with another spur gear 38, fixed upon the adjacent portion of the shaft 7. A clutch element 39 is formed upon the gear 35 and cooperates with a manually shiftable clutch element 40, which is slidably keyed upon the shaft 32, and provided with an operating handle or lever 41. A suitable starting motor 42 may be geared with the shaft 32 for convenience in starting the secondary motor 34, after which the clutch element 40 may be engaged with the clutch element 39, so as to cause the air compressor 9 to be driven through the gearing described for building up an air pressure within the tank composed of the chambers 11 and 12, prior to placing the prime mover 5 into operation. As shown in a more or less diagrammatically in Figure 6, a magneto 43, if desired in the ignition system of the prime mover and the engine 34, may be suitably driven through gearing 44 from the drive shaft 7.

The head 23 of each cylinder of the prime mover 5 has a central screw threaded opening for reception of the usual spark plug 45, which is adapted to furnish the necessary spark at proper intervals, as is well known in the art, for exploding the charge in the combustion chamber 25, which imparts the necessary impulse to the rotor 6 of the adjacent cylinder.

Directly above the exposed central portion of the drive shaft 7, a plurality of cylinders 46 are suitably mounted, each having a piston 47, and a depending piston rod 48 operatively connected to a suitable crank 49 formed upon the adjacent portion of the shaft 7. A carburetor 50 is suitably mounted adjacent the cylinders 46, and the outlet 51 of this carburetor is adapted to convey the explosive mixture of air and gasoline or the like through a manifold 52 having branches leading to each of the cylinders 46, and provided with spring seated check valves 53. Each cylinder 46 is also provided with a discharge line 54, leading to one of the cylinders of the prime mover 5 at a point beside its spark plug 45, as shown in Figure 4, and the fuel intake of the prime mover cylinder is provided with an outwardly seating check valve 55, which permits free ingress of fuel, but prevents escape of the gases from the explosion in a well known manner.

By means of the above construction, the fuel is drawn successively at proper times into the cylinders 46 past the check valves 53 thereof upon the suction or down stroke of the pistons 47, and this explosive charge is then positively forced outwardly through the discharge line 54 of each cylinder to its respective cylinder of the prime mover; the supply of compressed air and the forcibly fed fuel charge to each combustion chamber 25 occurring simultaneously to provide a highly efficient explosive mixture yielding extremely great power when exploded through the instrumentality of the spark from the adjacent plug 45. As the air compressor 9 is driven constantly from the shaft 7, a continued supply of compressed air is insured at all times, and this compressed air may be utilized to operate the rotors 6 of the prime mover for a limited time, depending upon the capacity of the chambers 11 and 12, should the ignition or explosive charge supplying means fail, thus insuring safe landing, when the invention is employed as a power plant for airplanes or the like.

From the foregoing description, it is believed that the construction and operation as well as the advantages of the invention will be readily understood and appreciated by those skilled in the art.

Minor changes may be made therein, without departing from the spirit and scope of the invention as claimed.

Having thus described my invention, what I claim as new, and desire to secure by Letters-Patent, is:

A rotary engine comprising a casing having a circular chamber with an exhaust port disposed in alignment with the center of said chamber, the casing being provided above the said chamber with an expansion firing chamber, a closure for the firing chamber and having an intake port leading into the firing chamber and with its edge at its discharge end spaced from the side wall surfaces of the firing chamber, the inner end portion of said port being disposed downwardly and with its axis disposed tangentially with relation to a circle struck from the center of the first mentioned chamber, and a circular rotor journaled in the first mentioned chamber and having a segmental recess, the transverse sectional area of which is equal approximately to one-fourth of the side area of the rotor.

In testimony whereof I affix my signature.

PATRICK BROUGHTON.